No. 648,445. Patented May 1, 1900.
P. UTO.
TIRE TIGHTENER.
(Application filed Mar. 2, 1900.)
(No Model.)
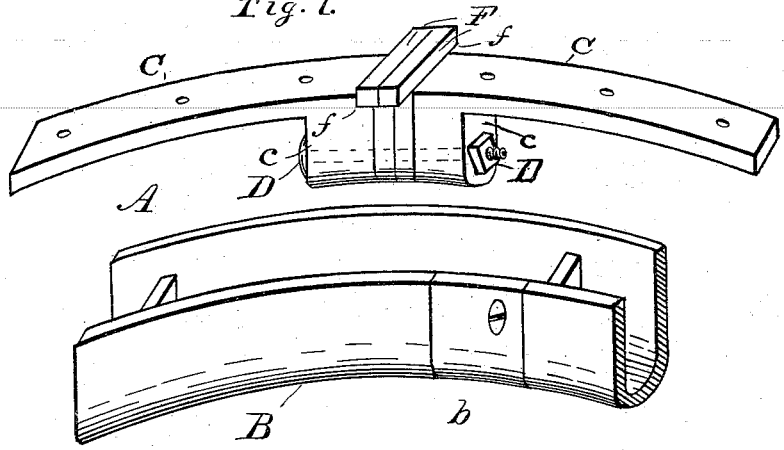
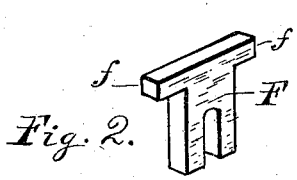 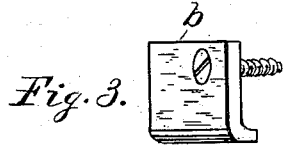
WITNESSES:
INVENTOR
Peter Uto
BY
Thomas P. Simpson
ATTORNEY

UNITED STATES PATENT OFFICE.

PETER UTO, OF TONKAWA, OKLAHOMA TERRITORY.

TIRE-TIGHTENER.

SPECIFICATION forming part of Letters Patent No. 648,445, dated May 1, 1900.

Application filed March 2, 1900. Serial No. 7,102. (No model.)

*To all whom it may concern:*

Be it known that I, PETER UTO, a citizen of the United States, residing at Tonkawa, in the county of Kay and Territory of Oklahoma, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates generally to the tightening of metallic tires on the wheels of vehicles, and has for its special object to save time, labor, and expense in the operation.

Figure 1 of the drawings is a perspective view of the felly-section, showing the two parts thereof separated, one being placed above the other. Fig. 2 is a detail view of one of the spacers, showing its bifurcation and extension-head; and Fig. 3 is a detail view of the cover over the aperture in the side of trough, together with its fastening-screw.

In the drawings, A represents a felly-section, which consists of the trough B, with the cover $b$ over an aperture in its side, and of the upper portions C C, provided with the terminal heads $c\ c$, the latter being held in conjunction by a headed screw D, on which works the nut E.

F represents the spacers, which go between the ends of the parts C C and those of the metallic tire. These spacers are bifurcated, so as to straddle the screw D, and are provided with extensions $f\ f$, one on each side of tire, to facilitate their removal and insertion when the nut E has been loosened. They are preferably made of varying thickness, so that a thinner one may be substituted for a thicker one or one simply removed, according to the degree of slack or looseness in the tire on the wheel. These spacers F are also made to extend down between the heads $c\ c$ in order that the latter may clamp them tightly, this being effected by simply tightening the nut on the screw.

The cover $b$ protects the side opening in trough, through which access is had to the nut E, which may then be readily turned so as to remove or insert a spacer F. As soon as one of the tires on a vehicle-wheel shows looseness the driver can jump down, remove cover $b$, loosen nut E, take out one of the spacers F, remove it and, if necessary, insert a thinner one, tighten up the nut, and the whole operation has been performed in less than five minutes.

Having thus described all that is necessary to a full understanding of my invention, what I claim as new, and desire to protect by Letters Patent, is—

The combination of the hollow trough B having the covering $b$, the felly ends having the heads $c\ c$ connected by a screw and nut D E, and the bifurcated spacers F; whereby a cut metallic tire may be tightened in the manner described.

In testimony whereof I affix my signature in presence of two witnesses.

PETER UTO.

Witnesses:
JESS JACKSON,
E. E. CASS.